June 28, 1960

M. A. KARPELES 2,943,321

COURSE GUIDANCE SYSTEM

Filed Jan. 6, 1958

Inventor
MARK A. KARPELES
By
Attorney

June 28, 1960  M. A. KARPELES  2,943,321
COURSE GUIDANCE SYSTEM
Filed Jan. 6, 1958  5 Sheets-Sheet 2

Inventor
MARK A. KARPELES
By *Percy P. Lantzy*
Attorney

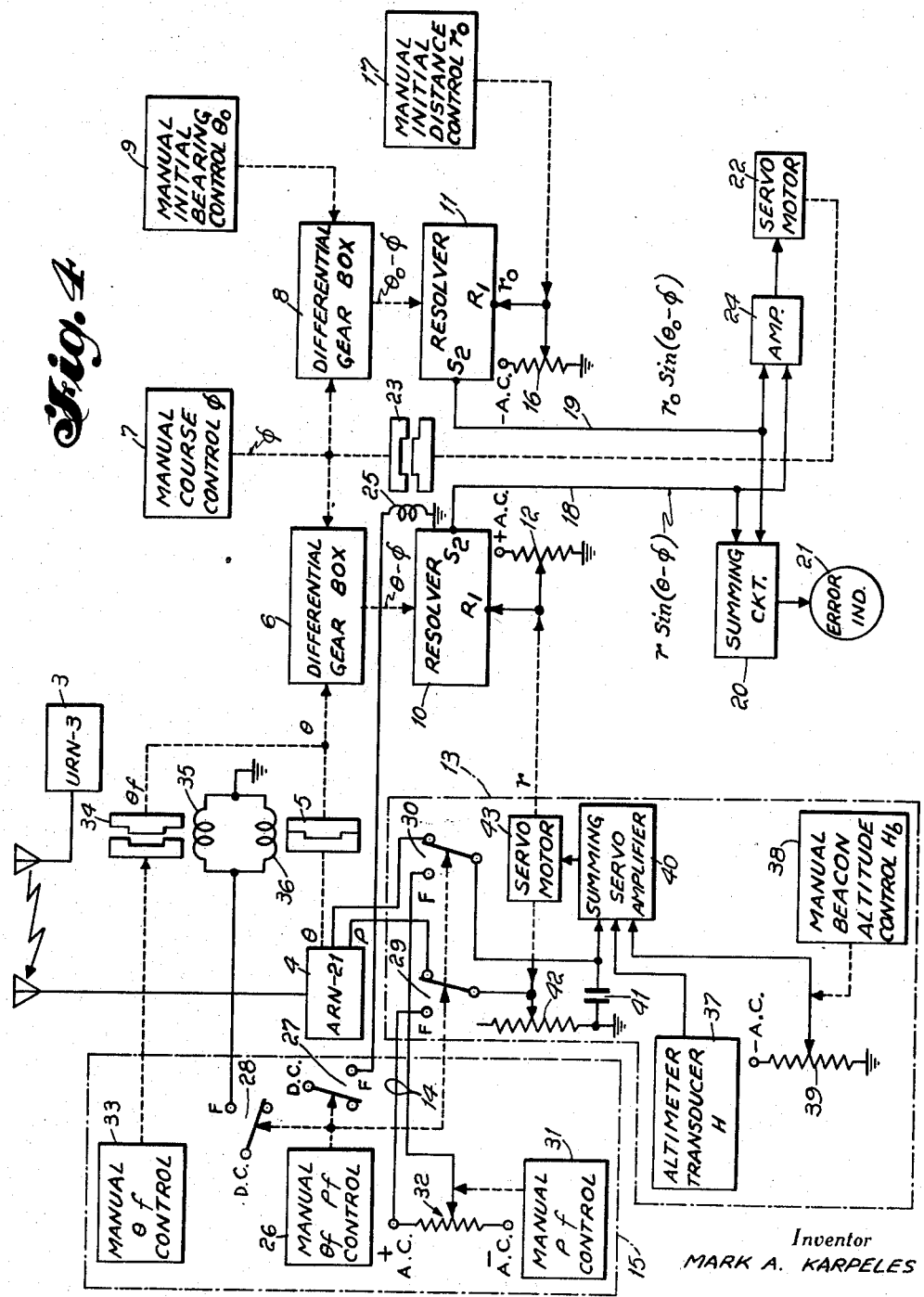

Inventor
MARK A. KARPELES

United States Patent Office 2,943,321
Patented June 28, 1960

2,943,321

COURSE GUIDANCE SYSTEM

Mark A. Karpeles, West Orange, N.J., assignor to International Telephone and Telegraph Corporation, Nutley, N.J., a corporation of Maryland Filed Jan. 6, 1958, Ser. No. 707,383

5 Claims. (Cl. 343—112)

This invention relates to radio navigation systems and particularly to a system for maintaining a craft on any desired course as it moves within the range of a beacon transmitting coordinate information to within the range of another beacon transmitting the same type information and also as it moves between beacons in zones outside the ranges of the beacons.

The problem of providing steering information to steer a craft, such as an aircraft, along a given course whether by employing dead reckoning or by employing navigation aids, such as Loran, requires extensive computing and/or plotting by a human navigator who relays steering information to the pilot. In the past, some navigation aids have been employed in craft which detect radio or radar signals and provide steering information directly to the pilot in the form of audible or visual signals without requiring the continual aid of a human navigator. However, these prior systems have limited application as they are employed only to guide a craft over certain fixed courses, such as in ILS or other systems where a craft is directed towards a beacon, transponder, or body reflecting electromagnetic waves. Other prior navigation aids employed to guide aircraft do not automatically provide guidance information directly to the pilot by which he can readily steer his craft to follow any chosen course provided that course lies predominantly wthin the range of beacons transmitting position information.

Therefore, the principal object of this invention is to provide a navigation aid to guide steering of a craft so that it may follow any desired course falling predominantly within the range of beacons transmitting position information.

Another object of this invention is to provide a simple steeering signal to the pilot of a craft whereby he may readily control his craft to follow said desired course even outside the range of said beacons for a reasonable distance.

Another object of this invention is to provide a navigation system with which a known land course may be maintained irrespective of the direction and velocity or changes in the direction and velocity of the wind when that course is within range of beacons transmitting position information.

Another object is to provide a navigation system with which a known land course may be maintained even upon leaving the range of all of said beacons whereupon steering guidance is based upon dead reckoning principle and the wind velocity and direction when last established.

Another object is to provide an automatic steering guidance system whereby the pilot may set his initial position and final desired position relative to a known position or may set his initial position and desired course angle, then subsequently employ a simple null-type indicator indicating deviations from the desired course to guide the steering of his craft.

A further object is to provide automatic steering guidance to guide a craft over a predetermined course falling predominantly within the range of one or more beacons transmitting polar coordinate position information, such as in the TACAN radio navigation system, and employed in conjunction with the mobile epuipment of said TACAN system, such as the ARN-21, to provide steering guidance to the pilot of said craft and to further provide a wind computer which automatically computes the wind vector and may be operated so as to produce said polar coordinate position information when the craft is outside the range of said beacons or said coordinate information from said TACAN system is unavailable.

It is a principal feature of this invention to employ polar coordinate information from the ARN-21 receiver tuned to an initial beacon of the TACAN radio navigation system in conjunction with the angle of a desired course and the polar coordinates of an initial starting point which may be known or obtained from the same receiver as inputs to an A.C. analog steering computer from which to energize a null-type indicator indicating deviations on either side of said desired course whether that course be directly towards said TACAN beacons or a skew course.

It is another feature of this invention to employ an A.C. analog-type wind computer responsive to said polar coordinate information from the ARN-21 receiver, aircraft heading and true air speed to compute wind velocity and direction so that upon leaving the range of all of said beacons or upon the failure of said ARN-21 receiver to receive said polar coordinate information, said analog-type wind computer may be employed in reverse to compute the missing polar coordinate information which is indicative of the craft's position as a function of the last computed wind velocity and direction, craft heading, and true air speed, yielding the missing polar coordinate information input to said A.C. analog steering computer and causing it to continue to provide steering information via said null-type indicator after said failure or after the craft leaves the range of all of said beacons.

Other and further features and objects of this invention will be more apparent from the following specific description taken in conjunction with the figures in which:

Fig. 2 depicts the relationship between aircraft position and TACAN beacon position and the direct and horizontal distances between them;

Fig. 4 depicts an electrical schematic and block diagram of the skew course guidance computer;

Fig. 5 depicts angles and rates and polar coordinates from which to better understand the wind computer shown in Fig. 6;

Figure 1:
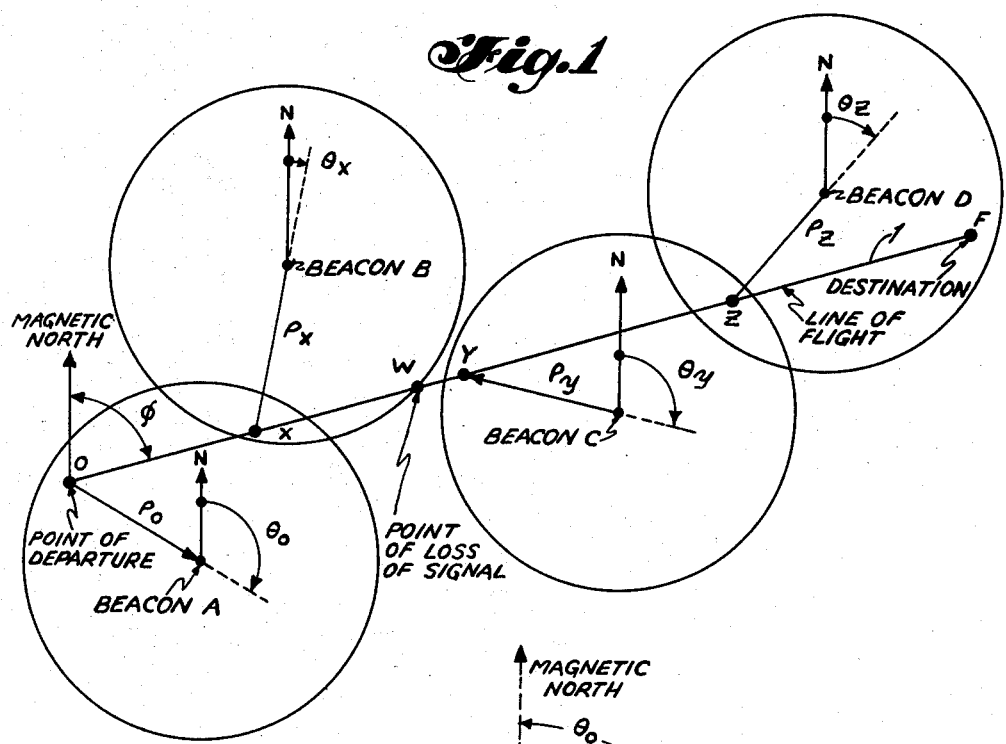
Fig. 1 depicts a typical straight line skew course passing within the ranges and between the ranges of typical TACAN beacons and extending from an initial point of departure to a destination or final point.

Referring first to Fig. 1, there is shown a plan view of four position information transmitting beacons A, B, C, and D such as employed in the TACAN radio navigation system and referred to as the URN-3. Each of these beacons transmits signals from which two-dimensional polar coordinate information may be obtained. The desired course or line of flight 1 is shown passing through and between the fields of beacons A, B, C, and D forming an angle $\phi$ to the magnetic north vector. The initial coordinates at the point of departure 0 are $\rho_0$ and $\theta_0$ with respect to beacon A. The value $\rho_0$ and $\theta_0$ may be detected by the ARN-21 receiver of the TACAN system or they may be known. Subsequently as the craft progresses along line 1 towards point X, $\rho$, and $\theta$, information from beacon A is received and together with $\rho_0$ and $\theta_0$ and $\phi$ is employed in the skew course computer shown in Fig. 4 to energize a null-type indicator indicating right or left deviations from the desired course line 1.

Upon reaching point X, the signal from beacon B is received producing a new set of initial coordinates $\rho_x$ and $\theta_x$ which locate the craft with respect to beacon B. These initial coordinates $\rho_x$ and $\theta_x$ may be manually set in the skew course computer shown in Fig. 4, or automatic means may be provided so that as the craft continues along line 1 from X towards point W, the $\rho$ and $\theta$ information received by the ARN-21 receiver is that transmitted from beacon B locating the craft relative to beacon B.

Meanwhile the wind computer shown in Fig. 6, which is responsive to $\rho$, $\theta$, true air speed of the craft, $V_a$, and magnetic heading of the craft $\gamma$, has been continually computing the wind vector by operating in what will be referred to as the normal or "N" condition and will be subsequently described. The wind vector is computed so that upon arriving at point W where all beacon signals are lost, $\rho$ and $\theta$ signals (with respect to beacon B) may be made available to the skew course computer. These $\rho$ and $\theta$ signals are made available by operating the wind computer backward in what will be referred to as the memory or "M" condition, in response to the last computed wind vector, true air speed, and magnetic heading. Thus, the skew course computer shown in Fig. 4, which derives $\rho$ and $\theta$ signals from the TACAN ARN-21 receiver will continue to receive $\rho$ and $\theta$ position information with respect to beacon B to yield steering guidance to the pilot as the craft progresses from point X to point Y.

At point Y initial polar coordinate position information with respect to beacon C is received, $\rho_y$ and $\theta_y$, which may be automatically fed to the skew course computer or manually set as shown in Fig. 4 so that flight may continue along line 1 to point Z where the same action occurs again. Obviously, numerous beacons may be employed over an extended line of flight, and it is only required that the carrier frequency of subsequent beacon signals be anticipated to insure a switch-over as described at points X and Z or to minimize the distance the craft will travel over which no beacon signal is received, such as from W to Y.

In order to achieve a higher level of accuracy so that the skew course computer may provide guidance over a desired ground path, particularly when that path is close to a beacon and/or the craft is at high altitude, the projection of the distance $\rho$ on the sea level plane, denoted $r$, is desired rather than the distance $\rho$ itself. Means to solve the right triangle formed by $r$, $\rho$, and the altitude difference between the craft and the beacon are included in the skew course computer shown in Fig. 4 and will be described later. Fig. 2 is provided to aid in understanding the relationship between $r$ and $\rho$. In this figure the craft 2 a distance $\rho$ from the beacon 3 and at an altitude H above sea level is a height H—$H_b$ above the beacon. Obviously, the sum of A.C. voltages proportional to H—$H_b$ and $r$, if they are in quadrature, will be equal to a voltage proportional to $\rho$. Thus $r$ may be equated electrically to $\rho$ when H and $H_b$ are known.

Figure 3:
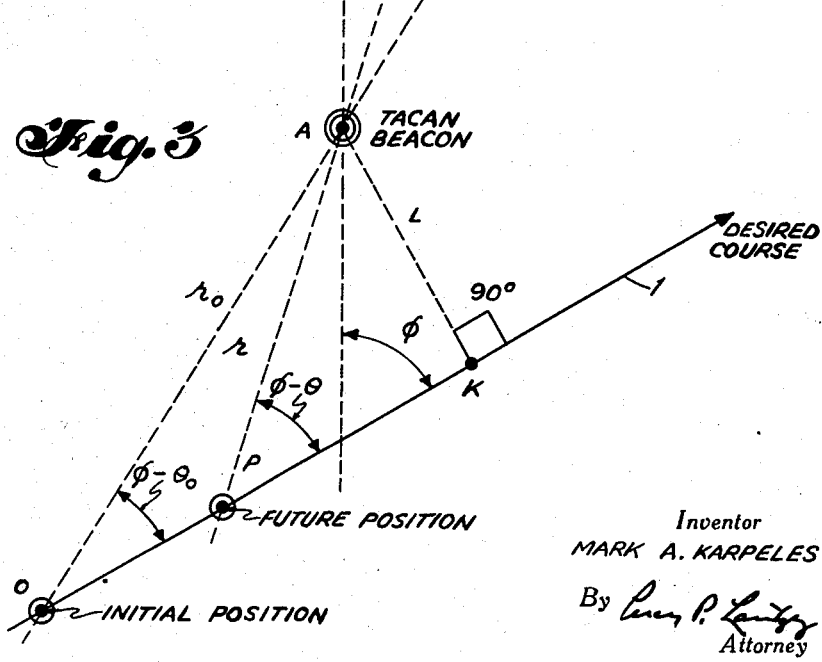
Fig. 3 depicts the angles and distances and polar coordinates from which to better understand the function of the skew course guidance computer shown in Fig. 4.

Referring next to Fig. 3, there is shown geometry to aid in understanding the operation of the skew course computer shown in Fig. 4. In Fig. 3, line 1 indicates the desired course or line of flight in a direction $\phi$ with respect to magnetic north, said course commencing at 0 which is described by ground polar coordinates $r_0$ and $\theta_0$ and passing through any point P described by coordinates $r$ and $\theta$. Line L is a perpendicular from A to line 1 crossing line 1 at point K. Obviously, line L is common to triangles OAK and PAK so that at any point P along line 1 the following relation exists:

$$r_0 \sin(\theta_0 - \phi) = r \sin(\theta - \phi)$$

Thus the difference between the left and the right members of this equation is indicative of the craft deviation from the desired ground course represented by line 1.

Referring next to Fig. 4, there is shown a skew course steering computer employed in conjunction with the TACAN radio navigation system, which system is represented by a transmitter and responder beacon 3 (one type being identified and known as the "URN-3") located at some known point on the ground and the ARN-21 receiver and transmitter 4 in craft 2. The outputs of ARN-21 receiver are a voltage proportional to $\rho$ and a shaft rotation proportional to $\theta$ which are indicative of the craft's position with respect to the location of the beacon 3. Shaft position $\theta$ is fed to normally engaged clutch 5 and thence to differential gear box 6. The desired course $\phi$ is set by manual course control 7 which feeds a shaft position proportional to $\phi$ to differential gear box 6 and to differential gear box 8, which is also fed a shaft position proportional to $\theta_0$ from manual initial bearing control 9. Thus the shaft rotation output from differential gear box 6 is proportional to $\theta - \phi$ and the output from differential gear box 8 is proportional to $\theta_0 - \phi$. These shaft positions are fed to resolvers 10 and 11, respectively.

Resolver 10 receives a voltage proportional to $r$ at its rotor coil $R_1$ from potentiometer 12, which is actuated by shaft rotation from right triangle solver 13, which is in turn fed a voltage proportional to $\rho$ from receiver 4 or, when the final position of a desired course with respect to a given beacon, $\rho_t$ and $\theta_t$ is known and $\phi$ is not known, right triangle solver 13 receives a voltage proportional to $\rho_t$ via line 14 from final position input control unit 15.

Resolver 11 receives a voltage proportional to $r_0$ at its rotor coil $R_1$ from potentiometer 16 actuated by a shaft rotation proportional to $r_0$ from manual initial distance control 17.

Thus the voltage output from resolver 10 at its stator coil $S_2$ which is fed to line 18 is proportional to $r \sin(\theta - \phi)$ and the output from resolver 11 at its stator coil $S_2$ which is fed to line 19 is proportional to $r_0 \sin(\theta_0 - \phi)$ when the value of $r$ is derived from the output of receiver 4 rather than unit 15. Lines 18 and 19 feed their signals to summing circuit 20 where they are effectively compared since potentiometers 12 and 16 are energized by voltages of opposite polarity. Summing circuit 20 energizes error indicator 21 which is sensitive to phase and indicates deviations of the craft's position from desired course line 1.

When the course angle $\phi$ is not known but the coordinates of a position on the course, as, for example, the final position $\rho_t$, $\theta_t$, are known as well as the coordinates of some other position on the course, such as $r_0$, $\theta_0$, then $\phi$ can be determined by the servo loop comprising motor 22 driving normally disengaged clutch 23 in response to the output of servo amplifier 24 which is fed signals from lines 18 and 19. This clutch is caused to be engaged when coil 25 is energized, which occurs when manual $\theta_t$ and $\rho_t$ control 26 of unit 15 positions switch 27 at its terminal F thus applying D.C. voltage to coil 25. Manual control 26 positions switches 27, 28, 29, and 30 at their respective F terminals and may be actuated by the pilot when it is desired to establish the setting $\phi$ of manual course control 7. For this purpose manual $\rho_t$ control 31 driving pot 32 and manual $\theta_t$ control 33 feeding a shaft position to normally disengaged clutch 34 are provided so that when switches 27, 28, 29 and 30 are positioned at their F terminals, coil 25 is energized causing clutch 23 to engage, coils 35 and 36 are energized causing clutches 34 and 5 to engage and disengage, respectively, and $\rho_t$ rather than $\rho$ is fed to right triangle solver 13 via line 14. Consequently one shaft input to differential gear box 6 is $\theta_t$ instead of $\theta$ and a signal proportional to $r_t$ is fed to resolver 10 instead of $r$ and also the shaft position output of motor 21 is coupled to differential gear boxes 6 and 8 and to manual course control 7 to establish $\phi$. Once $\phi$ is established in this manner control 7 may be locked and switches 27, 28, 29 and 30 repositioned for normal operation so that the skew course computer provides steering guidance.

Right triangle solver 13 operates in the following manner to yield a shaft position $r$ output for a voltage $\rho$ input (see also Fig. 2). A positive voltage derived from pressure altitude (H) transducer 37, and a negative voltage derived from manual beacon altitude ($H_b$) control 38 (via potentiometer 39) are applied to the input circuit of servo amplifier 40 where they are added to the voltage across capacitor 41. The initial phasing between the voltage $\rho$ input and the signals indicative of $H_b$ and H are such that the voltage across capacitor 41 is in phase with the voltages indicative of H at $H_b$ fed to servo amplifier 40. The voltage impressed across capacitor 41 and feedback pot 42 is obtained from switches 29 and 30 and is proportional to $\rho$ or $\rho_t$ depending on the operation of unit 15. Feedback pot 42 is varied by the shaft output of servo motor 43 which is indicative of $r$. This motor is energized by the output of servo amplifier 39. Obviously, the voltage impressed across pot 42 and capacitor 41, which are in series, is proportional to $\rho$ and can be represented by two vector voltages in quadrature, for example, the voltage across potentiometer 42 which is equivalent to $r$ and the voltage across capacitor 41 which is equivalent to H—$H_b$. Thus motor 43 drives until the inputs to servo amplifier 40 sum to zero yielding a shaft rotation indicative of $r$.

Turning now to Fig. 5, there is shown a typical condition that is solved by the wind computer shown in Fig. 6. In Fig. 5 the aircraft 2 at point 0 heading at an angle $\gamma$ to magnetic north at a true air speed $V_a$ and ground speed $V_g$ which form the desired course angle $\phi$ with magnetic north. The position 0 is described by $\rho$ and $\theta$ with respect to the TACAN beacon at A. The vector difference between $V_a$ and $V_g$ is the wind vector represented as $V_w$ at an angle $\theta_w$ to magnetic north. Other angles and vectors are self-explanatory. Briefly, the wind computer solves three right triangles successively to arrive at the magnitude and direction of the wind vector ($V_w$ and $\theta_w$). These triangles in succession of solution are identified by angles $\beta$, $\delta$ and $\theta_d$.

Figure 6A:
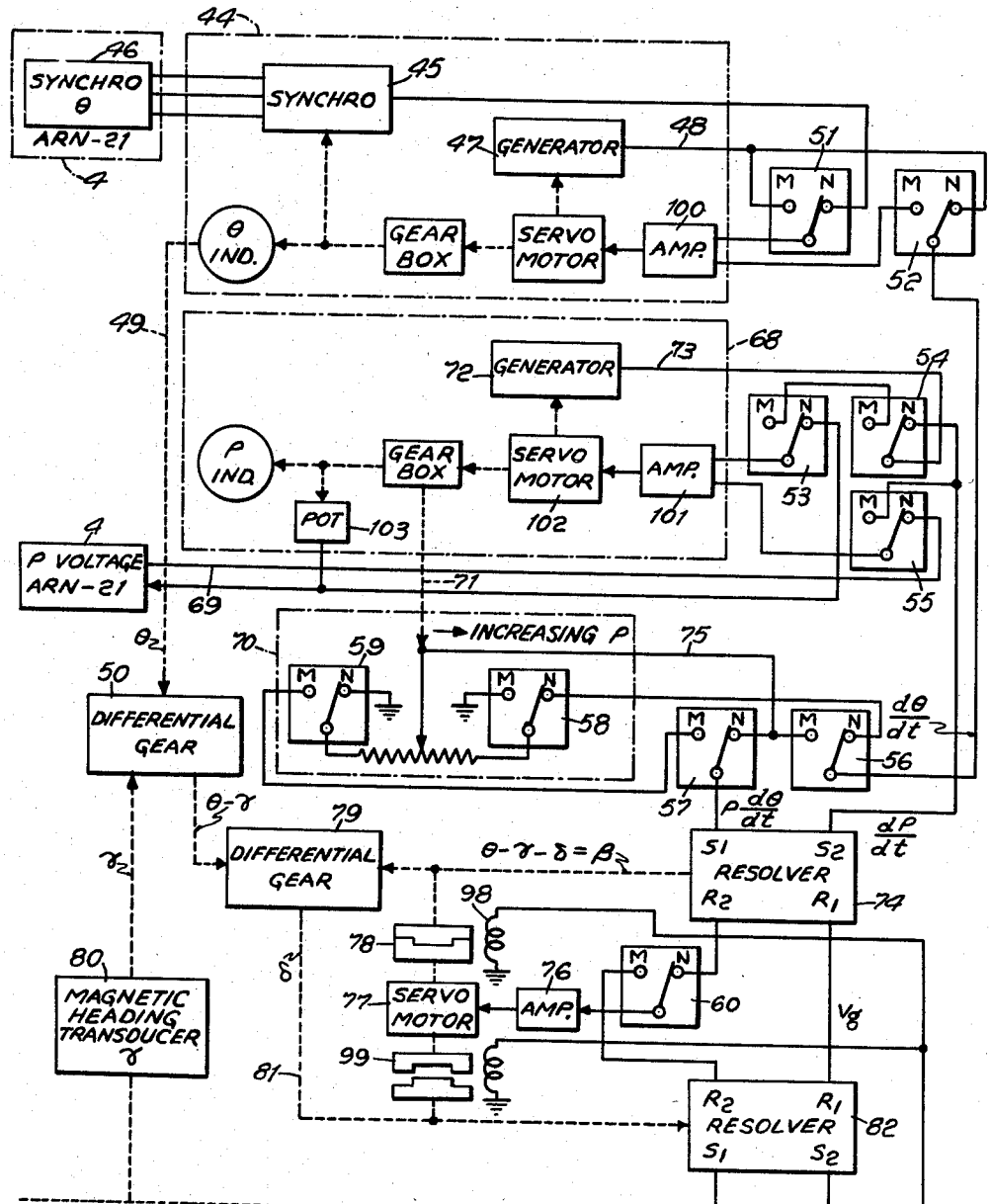
Fig. 6A depicts one portion of an electrical schematic and block diagram of the reversible wind computer employed in conjunction with the skew course guidance computer shown in Fig. 3.
Figure 6B:
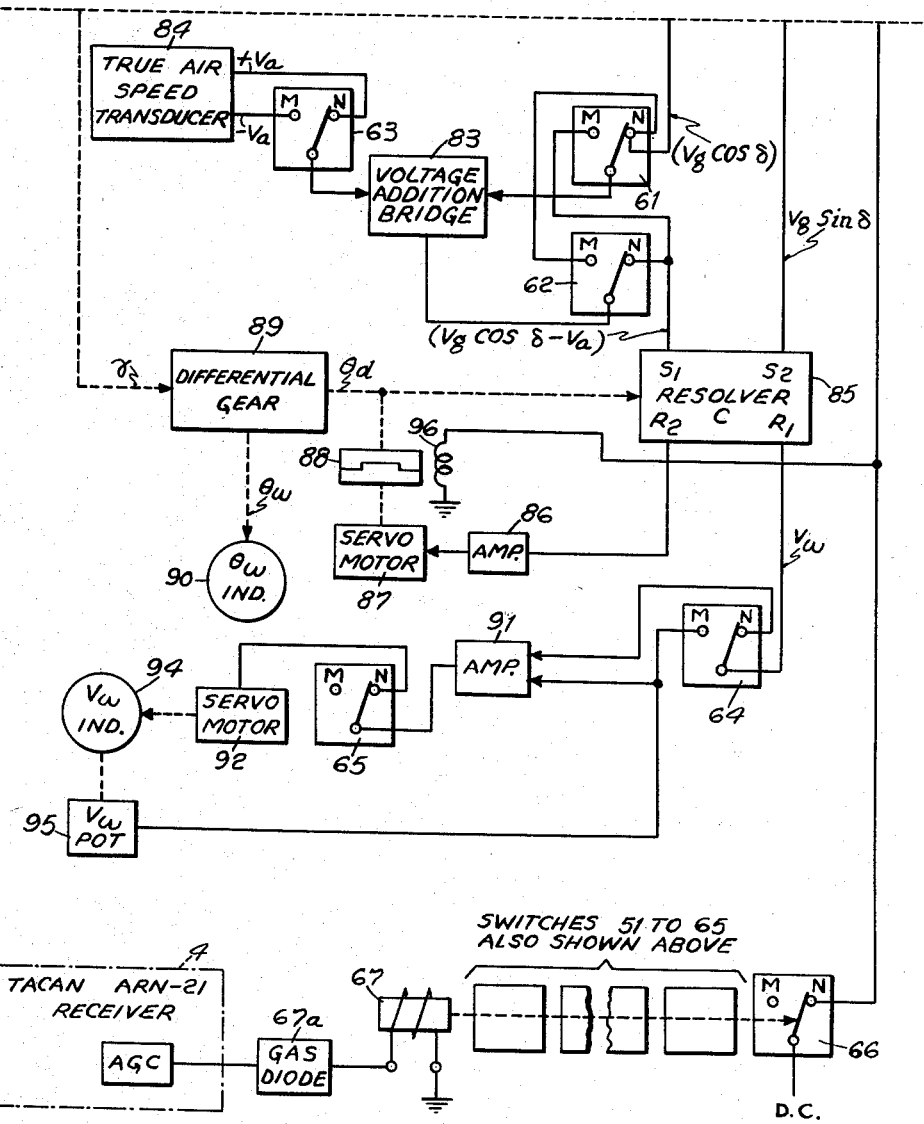
Fig. 6B depicts the remaining portion of the reversible wind computer.

Referring now to Figs. 6A and 6B, there is shown the A.C. analog-type wind computer for solving the right triangles described above and comprising a $\theta$ servo loop 44 having a synchro 45 coupled to a synchro 46 in the ARN–21 TACAN receiver to obtain a signal indicative of $\theta$ which is differentiated by generator 47 producing a voltage proportional to $d\theta/dt$ in line 48. The signal $\theta$ is also converted to a shaft rotation and fed, via mechanical coupling line 49, to differential gear box 50 when switches 51 to 66 are at their "N" or normal operation terminals. These switches are all at their "N" terminals when relay solenoid 67 is not energized. Relay solenoid 67 is coupled to the output of the AGC circuit of ARN–21 TACAN receiver 4 by appropriate means such as hot cathode gas diode 67a so that when this receiver fails to receive either $\rho$ or $\theta$ information from any TACAN beacon and the AGC voltage increases sufficiently, gas diode 67a will conduct and relay solenoid 67 will be energized flipping each of switches 51 to 66 to their "M" or memory operation terminals at which time the wind computer operates in reverse to compute $\rho$ and $\theta$ rather than $V_w$ and $\theta_w$.

Continuing in normal "N" operation, the $\rho$ servo loop 68, responsive to a $\rho$ voltage from TACAN receiver ARN–21 via line 69, produces a shaft rotation proportional to $\rho$ which is fed to a multiplying or dividing circuit 70 via mechanical coupling line 71. The signal $\rho$ is also differentiated by means of generator 72 producing a voltage proportional to $d\rho/dt$ in line 73. Circuit 70 multiplies $d\theta/dt$ by $\rho$ and the product is fed to stator coil $S_1$ of resolver 74 via line 75 and switch 56, while line 73 feeds a signal proportional to $d\rho/dt$ to stator coil $S_1$ of this resolver via switch 53. Thereupon resolver 74 produces a voltage at its rotor coil $R_1$ proportional to $V_g$ when the error voltage from its rotor coil $R_2$ is nulled by a shaft rotation input to this resolver equivalent to $\beta$ or $\theta-\gamma-\delta$ (see Fig. 5). This error voltage is nulled by the servo loop including switch 60, servo amplifier 76, servo motor 77 and normally engaged clutch 78. The $\beta$ shaft output of clutch 78 is also coupled to differential gear box 79.

A shaft rotation proportional to the aircraft magnetic heading $\gamma$ is fed from transducer 80 to differential gear box 50, whose output shaft rotation is proportional to $\theta-\gamma$ and is fed to differential gear box 79, and since differential gear box 79 is also fed a $\beta$ shaft rotation, its output shaft rotation represented by mechanical coupling line 81 is indicative of $\delta$. This $\delta$ output from line 81 is coupled to resolver 82 whose rotor coil $R_1$ is coupled to rotor coil $R_1$ of resolver 74. Thus stator coils $S_1$ and $S_2$ of resolver 82 produce signals indicative of $V_g \cos \delta$ and $V_g \sin \delta$, respectively. The $V_g \cos \delta$ signal is fed via switch 61 to voltage addition bridge 83 where true air speed voltage from true air speed transducer 84 of the proper sign is added producing $V_g \cos \delta - V_a$ which is fed to stator coil $S_1$ of resolver 85 via switch 62. The other stator coil of resolver 85 is fed $V_g \sin \delta$ from stator coil $S_2$ of resolver 82. Thus, the voltage induced in rotor coil $R_1$ of resolver 85 is indicative of $V_w$ when the error voltage from coil $R_2$ of that resolver is nulled by the servo loop including amplifier 86, motor 87 and normally engaged clutch 88 which couples a shaft rotation proportional to $\phi d$ to resolver 85 and to differential gear box 89. Gear box 89 also receives a shaft input from heading transducer 80 so that its output shaft position is representative of $\theta_w$ and may be indicated on $\theta_w$ indicator 90.

Rotor coil $R_1$ of resolver 85 is coupled via switch 64 to a servo loop comprising amplifier 91, switch 65, servo motor 92 and $V_w$ potentiometer 95. The shaft output of servo motor 91 is coupled to $V_w$ indicator 94 and to $V_w$ potentiometer 95.

When $\rho\theta$ information is not available from the TACAN ARN–21 receiver for a given period, such as occurs when the craft moves from W to Y, shown in Fig. 1, and beacon signals are lost, relay solenoid 67 is energized and switches 51 to 66 are positioned at their terminals "M," thus reversing the operation of the wind computer commencing memory operation in the "M" condition. Subsequently the shaft rotation from $\theta_w$ indicator 90 is fed back to differential gear box 89 and a voltage indicative of $V_w$ is fed from $V_w$ pot 95 via switch 64 to rotor winding $R_1$ of resolver 85 and switch 66 applies D.C. energy to coils 96, 97, and 98 disengaging, engaging, and disengaging clutches 88, 99, and 78, respectively. Thus resolvers 85, 82, and 74 operate in a manner that is the reverse of the manner described during the normal or "N" operation. Also true air speed transducer 84 applies a signal indicative of $-V_a$ via switch 63 to bridge 83 whose output indicative of $V_g \cos \delta$ is fed via switch 62 of stator coil $S_1$ of resolver 82. Also circuit 70 serves to divide $\rho d\theta/dt$ by $\rho$ producing $d\theta/dt$ which is fed via line 75, switch 56 and switch 52 to amplifier 100 in the $\theta$ servo loop 44 and the output of generator 47 of this loop is fed via switch 51 to amplifier 100. Thus servo loop 44 integrates the input $d\theta/dt$ yielding a shaft rotation output indicative of $\theta$ which is fed via synchros 45 and 46 to the TACAN ARN–21 receiver to replace the lost $\theta$ signal and is also fed via line 49 to differential gear box 50. Meanwhile the signal from stator coil $S_1$ of resolver 74, indicative of $d\rho/dt$, is fed via switch 54 to amplifier 101 of $\rho$ servo loop 48 where it is integrated by the action of servo motor 102, generator 72 and switches 54 and 53 to yield a shaft rotation at 71 indicative of $\rho$. This shaft rotation is also fed to potentiometer 103 via a gear box and the voltage output of potentiometer 103 which is indicative of $\rho$ is then fed to TACAN receiver ARN-21 to replace the lost $\rho$ signal.

While I have described above the principles of my invention in connection with specific apparatus, it is to be clearly understood that this description is made only by way of example and not as a limitation to the scope of my invention as set forth in the objects thereof and in the accompanying claims.

I claim:

1. A course guidance system comprising transmitting and receiving means producing a first set of signals indicative of the position of a craft relative to a known position, means to generate a second set of signals indicative of a selected position on said course relative to said known position, comparing means coupled to said transmitting and receiving means and to said means to generate signals for comparing said first set of signals with said second set of signals, indicating means coupled to said comparing means to indicate deviations of said craft from said course, directive means for producing signals indicative of said craft's velocity and heading, means coupled to said transmitting and receiving means and to said directive means to compute wind velocity and direction, means coupled to said means to compute to store signals indicative of said wind velocity and direction, said means to compute being responsive in absence of said first set of signals to operate in reverse to compute said first set of signals in response to signals from said means to store thereby supplying said first set of signals to said comparing means.

2. In a radio navigational system having a beacon station which transmits positional information; a mobile receiver for receiving said positional information, a course computer coupled to said mobile receiver employing said information to produce signals indicative of deviations of the position of said mobile receiver from a given course, directive means producing signals indicative of the velocity and direction of travel of said receiver, a wind computer coupled to said mobile receiver and said directive means and responsive to said positional information and the velocity and direction of travel of said receiver to produce signals indicative of wind velocity and direction, storage means coupled to said wind computer to store said signals indicative of wind velocity and direction and signal detection means coupling said wind computer to said mobile receiver so that when said receiver fails to receive positional information said wind computer is caused to be operated in reverse computing said positional information in response to wind velocity and direction signals from said storage means and the velocity and direction of travel of said mobile receiver thereby supplying the positional information to said course computer.

3. A navigation aid providing steering information to guide a craft on a given course comprising a plurality of beacons transmitting signals from which the position of said craft may be obtained, and a mobile station having means to receive and detect said transmitted signals, means to generate other signals indicative of second and third positions on said given course, transducer means producing signals indicative of said craft's velocity and heading, computing means responsive to said detected signals and said transducer means to compute the wind velocity and direction, said computing means being coupled to said receiving means by signal level detection means so that when said receiving means fails to receive said signals indicative of said craft's position, said computing means is caused to be operated in a reverse manner producing signals indicative of said craft's position which are coupled to said receiving means, means coupled to said means to produce signals and said receiving means for computing the angle of said course means to store said computed angle, means coupled to said receiving means, said means to store and said means to generate signals for comparing said received signals with said third set of signals when said angle is known producing a signal indicative of deviations of said craft from said course, and indicating means coupled to said means for comparing to guide steering of said craft.

4. A navigation aid to guide steering of a craft over a given course and employed in conjunction with craft position detection means which provides coordinate signals indicative of the position of said craft comprising means to produce other coordinate signals indicative of other positions on said given course, course angle computing means coupled to said means to produce signals, course angle storage means coupled to said course angle computing means, comparing means coupled to said detection means, said storage means and said means to produce for comparing said coordinate signals indicative of craft position with coordinate signals indicative of one of said other positions as functions of said course angle, producing a signal indicative of deviations of said craft position from said course, craft heading and true air speed transducers, wind computing means coupled to said detection means and said transducers to compute wind velocity and direction and means coupled to said wind computing means to store signals indicative of wind velocity and direction, said wind computing means being coupled to said detection means by means responsive to the level of said coordinate signals indicative of craft position so that when said level reaches a predetermined value said wind computer operates in reverse computing said signals indicative of craft position.

5. A course guidance system to guide a craft over a given ground course and employed in conjunction with radio distance and direction measuring equipment which yields signals indicative of the radio distance and direction of said craft from a known point and including means to produce other distance and direction signals indicative of ground positions on said course, comprising means to convert radio distance signals to an equivalent ground distance signal, means to store a signal indicative of the angle of said course, switching means responsive to manual control for coupling radio distance signals from said measuring equipment and radio distance signals from said means to produce to said means to convert, course angle computing means coupled to said to convert, course angle computing means coupled to said means to produce signals, said means to convert and said means to store, comparing means coupled to said means to produce signals, said means to convert, said measuring equipment and said means to store for comparing one of said ground positions on said course with the position of said craft, indicating means coupled to said comparing means to indicate deviations of said craft from said given course, craft true air speed and heading transducers, wind computing means coupled to said measuring equipment and said craft transducers and responsive to radio distance and direction signals to compute wind velocity and direction and means coupled to said means to compute wind to store signals indicative of said wind velocity and direction, said means to compute wind coupled to said measuring equipment by signal level detection means so that when said equipment fails to yield distance and direction signals of given strength, said means to compute wind operates in reverse computing said signals indicative of radio distance and direction of said craft from said known point in response to signals from said means to store wind velocity and direction signals, thereby supplying said signals indicative of radio distance and direction of said craft from said known point.

References Cited in the file of this patent

UNITED STATES PATENTS

| | | |
|---|---|---|
| 2,508,565 | Chance | May 23, 1950 |
| 2,582,588 | Fennessy | Jan. 15, 1952 |
| 2,715,995 | Wirkler | Aug. 23, 1955 |
| 2,794,594 | Ergen | June 4, 1957 |